United States Patent [19]

Mercier

[11] 4,338,968

[45] Jul. 13, 1982

[54] HIGH FLOW ACCUMULATOR DEVICE HAVING POPPET VALVE CONTROL MEANS

[75] Inventor: Jacques H. Mercier, Paris, France

[73] Assignee: Normand Trust, New York, N.Y.

[21] Appl. No.: 188,861

[22] Filed: Sep. 19, 1980

[51] Int. Cl.³ .............................................. F16L 55/04

[52] U.S. Cl. ...................................... 138/30; 137/522; 251/65

[58] Field of Search .................... 138/30; 251/65, 282; 137/514.5, 514.7, 522, 523

[56] References Cited

U.S. PATENT DOCUMENTS

| | | | |
|---|---|---|---|
| 2,822,816 | 2/1958 | Schutmaat | 251/65 X |
| 3,556,686 | 1/1971 | Beer | 251/65 X |
| 4,067,360 | 1/1978 | Zirps | 138/30 |
| 4,164,242 | 8/1979 | Sandau | 138/30 |

*Primary Examiner*—James E. Bryant, III

*Attorney, Agent, or Firm*—Arthur B. Colvin

[57] ABSTRACT

An accumulator device is characterized in the provision of plural mechanisms for maintaining the oil port sealing valve member in open position, one said mechanism comprising a spring and the other comprising a control device member which may be activated to its valve stem releasing condition responsive to pressure drops of a predetermined magnitude or after a predetermined time interval.

6 Claims, 5 Drawing Figures

HIGH FLOW ACCUMULATOR DEVICE HAVING POPPET VALVE CONTROL MEANS

BACKGROUND OF THE INVENTION

1. Field of the Invention

The present invention is in the field of accumulator devices and is directed more particularly to a high flow accumulator device characterized in that the same is provided with auxiliary means for preventing premature or unwanted closure of the oil port.

2. The Prior Art

The use of accumulator devices, and particularly high capacity accumulator devices as a mechanism for energy storage is today commonplace. In many applications a high capacity accumulator is charged by the introduction of oil under pressure into the body of a pressure vessel divided into two chambers by an expansible bladder member. The introduction of oil into one chamber works to further compress gas confined in the second chamber to the opposite side of the bladder to store energy.

The stored energy in the compressed gas is utilized by connecting a work load to receive the output of oil expelled from the pressure vessel through an oil port.

In a typical construction, a poppet valve is moveably mounted in the oil port and is urged by spring pressure to an unseated condition whereat a portion of the valve extends into the pressure vessel and the oil port is open. Ideally, when the pressure drops in the hydraulic line connected to the work load to such degree that the gas pressure exceeds the oil pressure in the line, the oil is progressively forced past the open valve and to the load. When the oil has been substantially completely forced from the vessel by the expanding bladder, the bladder is intended to engage against the head of the poppet, urging the same downwardly against the force of the poppet support spring and into seated position, sealing the oil port, whereby extrusion of the bladder through the port is prevented.

It has been discovered that, in many instances in the devices heretofore known, the poppet valve seats prematurely, not as a result of contact with the expanding bladder but, rather, as a result of pressure differentials to opposite sides of the poppet valve head, such pressure differentials resulting from sudden extraction or flow of oil in the line to the work load and consequent pressure drops in the areas immediately below the valve head. In such instances the poppet valve may be sucked or drawn into contact with the valve seat, resulting in premature interruption of flow in the line to the work load.

The noted phenomenon is experienced particularly frequently in closed circuit or cyclically operated hydraulic systems wherein, for instance, the accumulator may be charged from a pump and thereafter the circuit to the pump interrupted, the work function being effected solely by energy derived from the discharging accumulator.

In order to combat the premature seating of the poppet due to flow conditions and pressure differentials, it has been proposed to increase the force of the poppet valve control spring which urges the valve toward the open position. However, by thus increasing the force of the spring. The valve may be retained open even after it is engaged by the bladder with resultant extrusion of the bladder through the open oil port.

SUMMARY OF THE INVENTION

The present invention may be summarized as directed to an improved accumulator device of the high flow type wherein the poppet is rendered resistant to premature or unwanted seating in the oil port without the necessity for employing an unduly heavy poppet support spring.

More particularly, the device of the present invention employs a poppet support spring having a force value calculated to be readily overcome by direct pressure from the bladder whereby the bladder is not unduly strained in urging the poppet to seated condition in the oil port.

The device contemplates the use of an ancillary or secondary means for resisting seating of the poppet which acts cooperatively with the poppet spring, the ancillary or auxiliary poppet support means being subject to removal from the poppet support condition responsive to some control mechanism. By this means, the poppet may be supported or locked in the open position both by the force of the spring and the force of the ancillary means during normal conditions of operation in which the oil port is intended to remain open.

Importantly, when the control mechanism is actuated at the time the oil port should be closed, the ancillary or auxiliary poppet support means is relieved of the poppet supporting function, whereby the sole force resisting seating of the poppet is provided by the spring. Thereby, the stresses exerted against the expanding bladder to prevent closing of the valve are the predictably low stresses provided by the spring.

Illustratively, and without limitation, the ancillary poppet support means may comprise a solenoid member located in a chamber below the oil port which cooperates with a highly magnetically permeable sleeve fixed to a stem portion of the poppet. When energized, the solenoid reacts with the permeable sleeve to resist movement of the valve stem, whereby the valve is held in open position by the cumulative forces of the solenoid and spring. Control means, which may be pressure sensitive, time sensitive, flow sensitive or the like, may be disposed within the chamber or elsewhere and connected to interrupt the circuit to the solenoid responsive to the sensing of a condition or time at which the poppet is intended to be closed, whereby the sole forces required to be overcome by the pressure of the bladder against the poppet are those forces exerted by the spring.

It is accordingly an object of the invention to provide an improved high flow accumulator device characterized in that seating of the poppet assembly to seal the oil port is resisted by a poppet spring and an ancillary poppet support means illustratively, but without limitation, a solenoid, the ancillary means being activated and deactivated responsive to a control which may be manual but which may be pressure sensitive.

A further object of the invention is the provision of an accumulator device of the type described wherein, in the normal operative condition, the poppet is urged to an unseated condition of the oil port by a poppet spring and movement from such unseated condition is resisted by an ancillary poppet support means such as a solenoid or an electrical or mechanical equivalent.

Still a further object of the invention is the provision of an accumulator of the type described and including pressure sensitive means for controlling the energized or deenergized condition of the solenoid or like ancillary poppet support means whereby the additional support provided by said means is either or not exerted depending upon the sensed pressure at a selected point within the device.

To attain these objects and such further objects as may appear herein or be hereinafter pointed out, reference is made to the accompanying drawings, forming a part hereof, in which.

Figure 1:
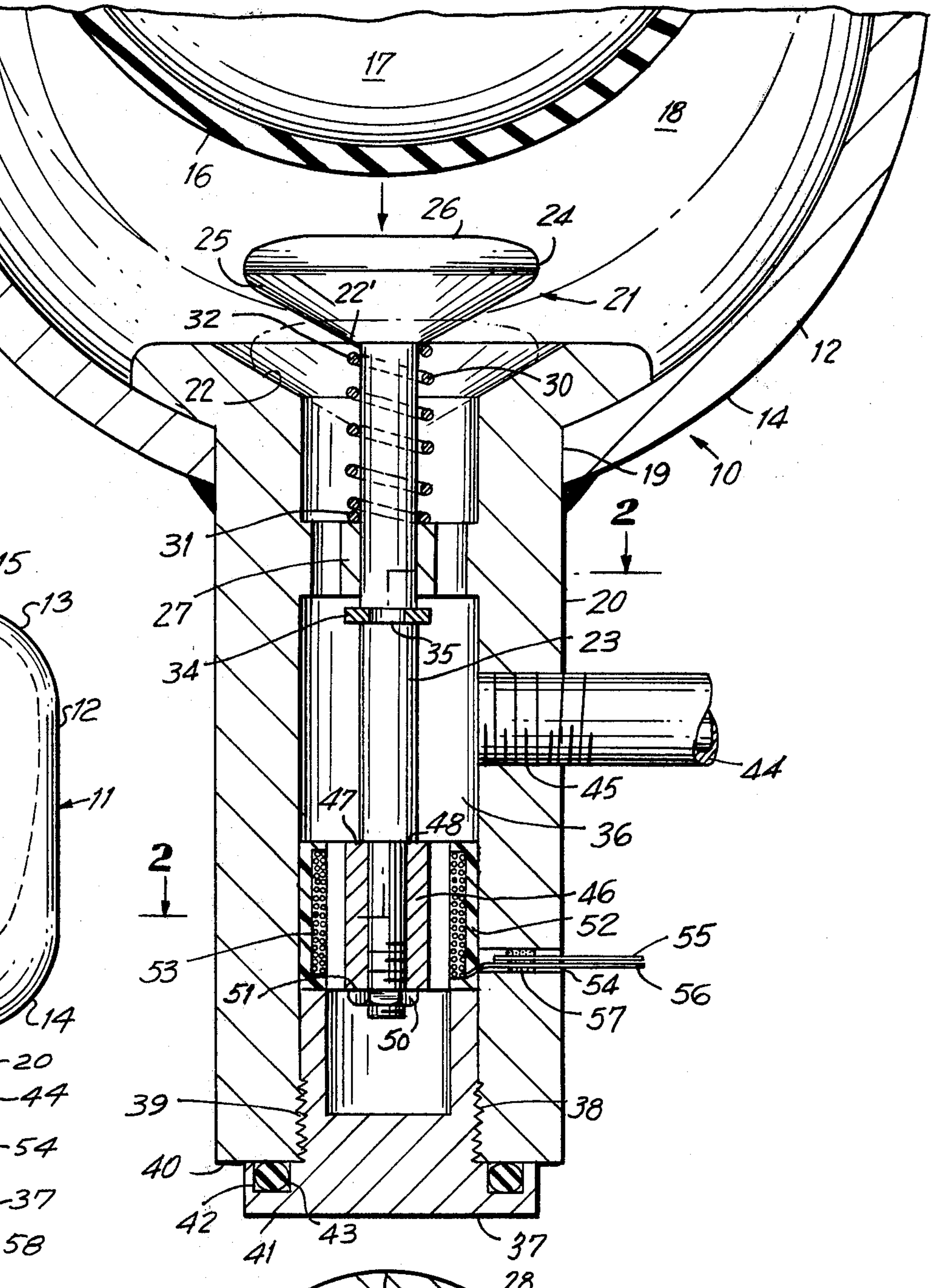
FIG. 1 is a fragmentary vertical sectional view through the oil port and associated components of an accumulator device in accordance with the invention.
Figure 3:
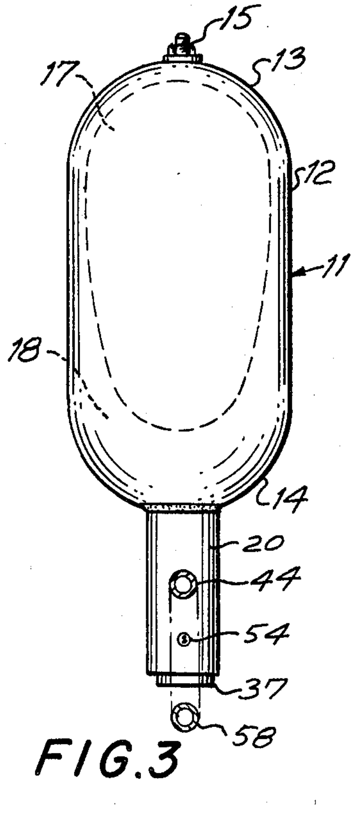
FIG. 3 is a side elevational view of the accumulator device on a reduced scale.

Referring now to the drawings, there is disclosed in accordance with the invention a hydraulic accumulator device 10 including a pressure vessel 11 which, in accordance with standard practice, includes a generally cylindrical body portion 12 having a hemispherical upper end 13 and a hemispherical lower end 14. A gas charging valve 15 is mounted in the upper end 13 of the pressure vessel. A bladder 16 having an open mouth portion surrounding the gas charging valve 15 divides the interior of the vessel 11 into two discrete chambers, notably a gas chamber 17 and an oil chamber 18.

The lower end 14 of the vessel includes an oil port 19 within which is mounted a fitting 20 carrying a poppet assembly 21. The fitting 20 includes an upwardly facing beveled valve seat 22.

The poppet assembly 21 includes a stem or shank 23 having a valve or poppet head 24 at the upper end thereof, the head 24 including a beveled undersurface 25 angularly configured to mate with the seat 22 in the lowered or closed position of the poppet.

As is conventional, the poppet is desirably shifted downwardly to its seated condition by pressure exerted against the upper surface 26 of the poppet by components of the bladder 16 when the same expands as a result of pressure within the chamber 17 exceeding the oil pressure within the chamber 18.

Figure 2:
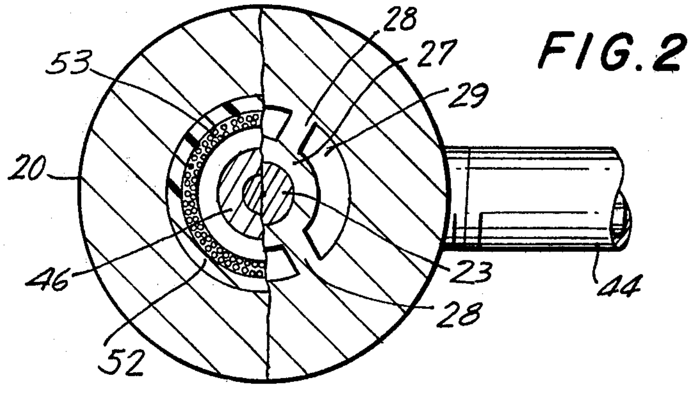
FIG. 2 is a horizontal, discontinuous section taken on the staggered line 2—2 of FIG. 1.

The valve stem 23 is guided for axial movement within the fitting 20 by a boss 27 in the form of a cylinder supported at the inner end by a series of radially extending the ribs 28—see FIG. 2. Spaces 29 between adjacent ribs are provided and define passages for the flow of fluid around the boss 27.

The poppet assembly 21 is maintained in its raised or solid line position shown in FIG. 1, by a lifting mechanism comprising a poppet control spring 30 surrounding the shank 23. The lower end 31 of the spring reacts against the boss 27 and the upper end 32 of the spring reacts against an area 22' of the poppet head 24 immediately surrounding the shank. Snap washer 34 seated in an annular groove 35 in the shank provides a limit stop against upward movement of the poppet.

An annular discharge chamber 36 surrounds the shank, the lower end of the discharge chamber being sealed by a plug 37 having an externally threaded portion 38 mating with complementally internally threaded portion 39 formed in the lower end 40 of the fitting 20.

The plug 37 includes a radially projecting shoulder 41 having an upwardly facing annular groove 42, within which is seated an O-ring 43 compressed against the undersurface of the end portion 40 of the fitting, providing a leakproof seal.

A conduit 44 for hydraulic fluid permitting flow into and out of the pressure vessel is tapped into aperture 45 formed in the wall of the fitting 20, the interior of the conduit 44 being thus in communication with the chamber 36.

The stem 23 carries a sleeve 46 of highly permeable magnetic material, the sleeve being maintained in fixed position on the stem as a result of its upper end 47 butting against a downwardly directed annular shoulder 48 formed on the stem 23. The lower end 49 of the stem is threaded and carries a stop nut 50 which clampingly engages against the undersurface 51 of the sleeve 46 to capture the sleeve in the desired position.

An annular insert member 52 is fixedly positioned within the chamber 36. The insert 52 is disposed in heightwise alignment with the sleeve 46 in the raised or oil-port-open position of the poppet assembly 21. A multiplicity of turns of conductive wire 53 are wound in the insert 52, defining a solenoid coil in initmate juxtaposition to the sleeve 46.

A transverse aperture 54 is defined in the fitting 20, the terminal leads 55, 56 of the solenoid coil being lead outwardly through the aperture 54. A fluid-tight sealing compound 57 is disposed in the aperture 54 to prevent fluid leakage outwardly through the aperture.

The operation of the apparatus will be apparent from the preceding description.

The chamber 17 is charged with gas under pressure and the conduit 44 is connected with a source of hydraulic fluid under pressure, P through a valve V. When the pressure of the gas exceeds that in the hydraulic line 44, the bladder 16 will have expanded, urging the poppet valve downwardly, seating beveled surface 25 against valve seat 22. Thereafter, when oil under pressure is admitted through open valve V into conduit 44, the poppet is caused to unseat and oil flows into chamber 18, causing the bladder to contract and compressing the gas within the chamber 17, whereby energy is stored in the gas.

Figure 4:
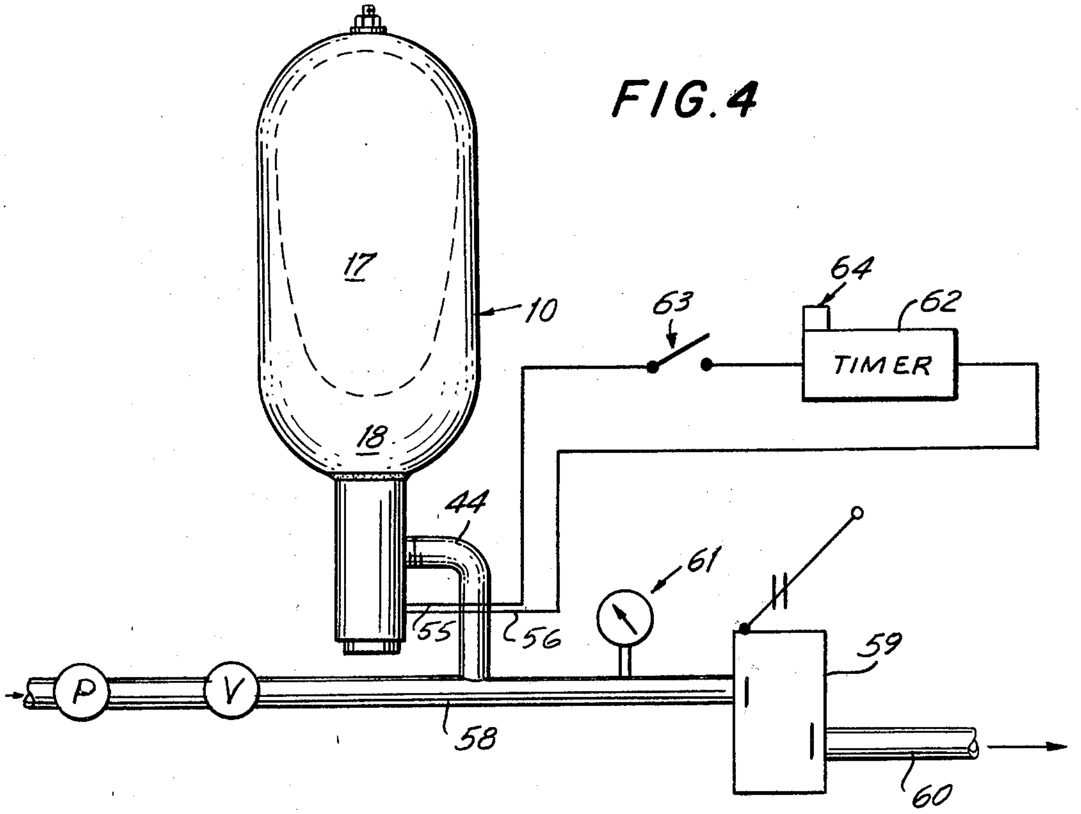
FIGS. 4 and 5 are schematic diagrams of representative circuits utilizing an accumulator device in accordance with the invention.
Figure 5:
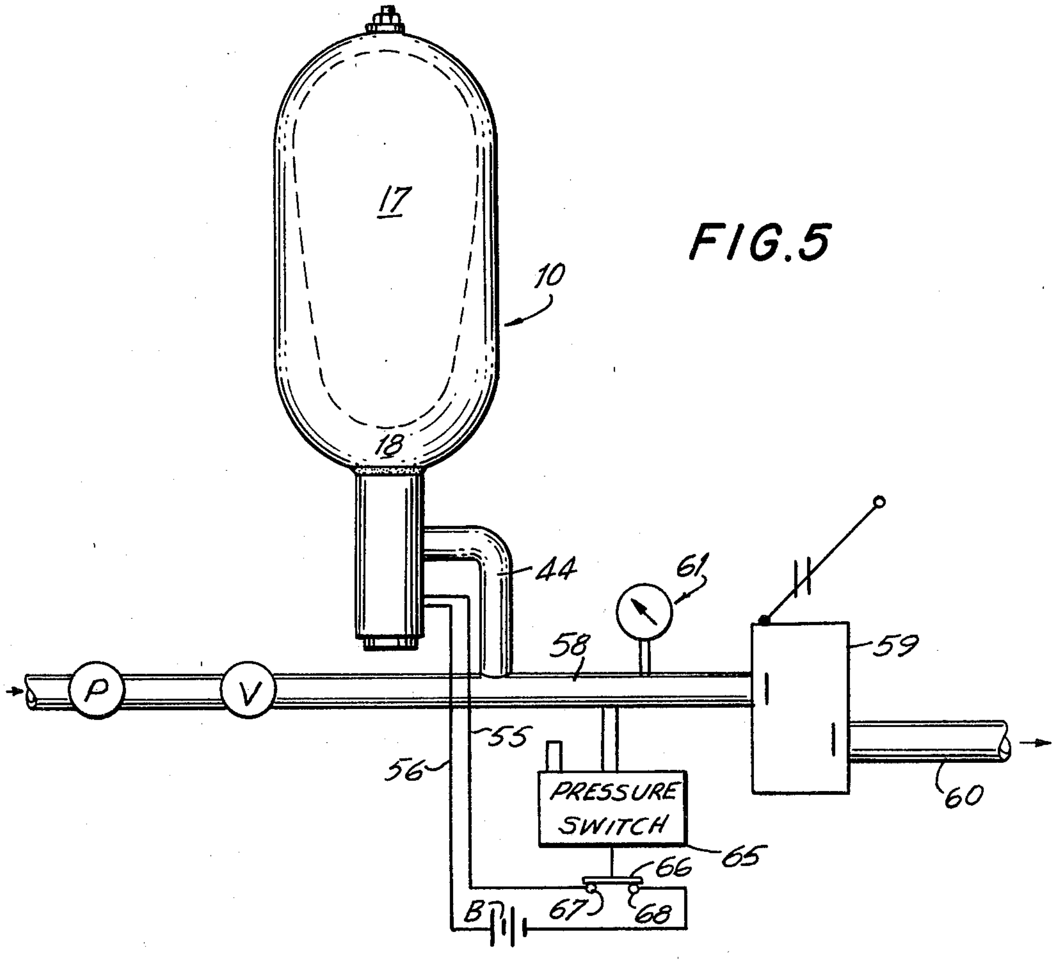

As will be best understood from the ensuing description of FIGS. 4 and 5, when it is desired to utilize the energy stored in the gas, fluid is caused to be forced outwardly through conduit 44 by reducing the pressure in the said conduit, i.e., as by isolating the conduit 44 from the source of hydraulic fluid under pressure, e.g. the pump P, by closing valve V, and permitting the oil to flow from chamber 18 to a work load.

With the release of fluid from chamber 18 to the work load, due to the rapid flow of fluid from chamber 18, the pressure immediately beneath the valve 24 will be reduced. The sudden surge of fluid, coupled with the resultant pressure reduction in the area below the valve head in a conventional device might be sufficient to overcome the lifting force of the poppet spring and induce the valve head prematurely to engage against the valve seat, checking the flow of fluid to the work load.

To avoid this possibility, in the device of the invention a current is caused to flow through the wires 55, 56 and coil 53, resulting in the creation of a magnetic field which cooperates with the permeable sleeve 46, providing an additional force on the valve stem which is resistant to movement of the poppet in the seating direction and in fact locks the valve head 24 in open position spaced from the valve seat 22.

Owing to the fact that the force exerted by the solenoid may be made proportional to the electrical current flowing in the coil, it will be readily recognized that through the use of an appropriate regulator device, such as a potentiometer, the resistance to seating may be varied in accordance with the application at hand.

When it is desired that the poppet be seated in the normal manner, i.e., by engagement with the expanding bladder 16, it is merely necessary to interrupt the current flow in the coil 53, whereupon the sole forces resisting seating of the poppet are those exerted by the spring 30. It will be understood that the interruption of current in the solenoid may be effected manually by actuation of a switch or automatically by a timer or as a result of a pressure sensitive switch communicated with the conduit 44 which activates the circuit responsive to pressures in the conduit of a selected low value.

As an illustration of environments in which the device may be used, reference is made to the circuitry schematic illustrated in FIG. 4. The pressure vessel 10 may be charged by hydraulic fluid emanating from pump P by opening valve V. Conduit 58 downstream of the valve V is now charged with oil under pressure which is permitted to flow through conduit 44 into the oil chamber 18 within the pressure vessel.

During the charging process manually operated valve 59 will normally be in the closed position whereby fluid flow from conduit 58 to the output conduit 60 leading to a work load is interrupted. Since during the charging process the pressure in lines 58 and 44 is higher than the pressure within the gas chamber 17, the poppet assembly 21 will be in its raised position with valve head 24 spaced from its seat 22.

After the accumulator is sufficiently charged with oil under pressure, valve V may be closed. Pressure gauge 61 in communication with the conduit 58 enables the operator to ascertain when the charging pressure has reached a desired level. When the desired level is reached, the system is now in a condition in which stored energy may be released to the work load via conduit 60 by operating manual valve 59 which communicates conduits 58 and 44 with conduit 60.

In the embodiment of FIG. 4 there is disclosed a timer assembly 62 which incorporates a source of electrical current, i.e., a battery and a normally closed switch. Switch 63 is now closed and start button 64 of the timer is depressed simultaneously with opening of the valve 59.

Opening of the valve 59 will, as noted, cause fluid to be propelled from the oil chamber 18 outwardly through conduit 44 and into work load conduit 60. Closing of switch 63 and will cause a flow of current in the coil 53, whereby the poppet valve 24 will be locked in the open position by the force exerted by the solenoid on the permeable sleeve 46.

When the timing cycle has been completed, timer switch 62 will open and the current flow in the coil 53 is interrupted, whereby the sole force retaining the poppet in the oil-port-open position will be those forces exerted by spring 30.

It will be appreciated that the poppet may thus be seated by pressure of the bladder against the upper surface 26 of the poppet or by a sufficient pressure differential in the areas above and below the poppet.

In accordance with FIG. 5, wherein like parts carry like reference numerals, there is disclosed a circuit whereby the coil 53 is deenergized responsive to the sensing of a predetermined low pressure in the conduit 44.

Assuming the accumulator 10 to have been charged with fluid from pump P as heretofore noted, and further assuming valve V to be shut, there is provided a pressure sensitive mechanism 65 having a switch member 66 which normally closes contacts 67, 68, permitting current from battery B to flow in the coil 53. When the work load control valve 59 is opened, permitting fluid to flow from conduit 44 into conduit 58 and thence to conduit 60, the pressure in conduit 58 will progressively drop.

During the initial flow periods, the poppet is resistant to moving to its seated position by the combined forces of the spring 30 and the locking action of solenoid 53. When the pressure in line 58 reaches a selected low level, the pressure switch 65 will cause switch member 66 to be disconnected from the contacts 67, 68, interrupting the flow of current in the coil 53, whereupon the sole poppet retaining force is provided by the spring 31. Thus, the final seating of the poppet may be effected by a relatively light pressure of the bladder 16 against the upper surface 26 of the poppet.

While in the present embodiments the auxiliary force maintaining the poppet in its lifted condition has been provided by a solenoid, it will be recognized that alternative means resisting premature seating of the poppet will readily occur to those skilled in the art and familiarized with the instant disclosure. By way of example, movements between the valve stem and fitting may be resisted by controlled forces other than electrical, i.e. pneumatic, hydraulic or the like. The controlled force may exert a resistance to movement of the stem or may effect a positive detenting. The force which restrains movement of the stem may be relieved either manually or automatically.

As will be understood by those skilled in the art and familiarized with the instant disclosure, alternate means of accomplishing the ends of the instant invention may be readily substituted for the specifics of the illustrated embodiments. Accordingly, the invention is to be broadly construed within the scope of the appended claims in respect of the concept of providing an ancillary means, in addition to the conventional poppet control spring, which restrains movements of the poppet to the valve seating position until such seating is called for by the operating conditions of the device, whereupon the ancillary forces are removed and the bladder need overcome merely the force of the poppet control spring.

Having thus described my invention, what I claim as new and desire to secure by Letters Patent of the United States is:

1. A pressure accumulator comprising a rigid container having a gas port and an oil port, a deformable partition in said container intervening between said ports and defining a gas chamber in communication with said gas port and an oil chamber in communication with said oil port, a fitting connected to said oil port having a valve seat at its inner end, a poppet valve associated with said valve seat, a valve stem extending axially in said fitting and having one end thereof secured to said poppet valve, resilient means normally urging said poppet valve to open position with respect to said valve seat, said fitting having port means for charging of said oil chamber and for discharge of oil under pressure therefrom, additional means associated with said valve stem to restrain movement of said poppet valve from said open position against the force resulting from high flow past said poppet valve into said fitting and discharging through said port means, and means cooperating with said additional means to decouple said additional means from said stem to permit movement of said poppet valve to closed position against said seat when required to prevent extrusion of said partition through said oil port.

2. Apparatus in accordance with claim 1 wherein said means cooperating with said additional means comprises a pressure sensing device.

3. A pressure accumulator comprising a rigid container having a gas port and an oil port, a deformable partition in said container intervening between said ports and defining a gas chamber in communication with said gas port and an oil chamber in communication with said oil port, a fitting connected to said oil port having a valve seat at its inner end, a poppet valve associated with said valve seat, a valve stem extending axially in said fitting and having one end thereof secured to said poppet valve, resilient means normally urging said poppet valve to open position with respect to said valve seat, said fitting having port means for charging of said oil chamber and for discharge of oil under pressure therefrom, additional means comprising an electromagnetic member associated with said valve stem and interposed between said fitting and said stem to restrain movement of said poppet valve from said open position against the force resulting from high flow past said poppet valve into said fitting and discharging through said port means, and means cooperating with said additional means to release said additional means to permit movement of said poppet valve to closed position against said seat when required to prevent extrusion of said partition through said oil port.

4. Apparatus in accordance with claim 3 wherein said electromagnetic member comprises a coil in fixed position within said fitting and an armature mounted on said stem in proximate spaced relation to said coil in the open position of said valve.

5. Apparatus in accordance with claim 4 wherein said coil surrounds said armature and said coil and stem are in coaxial alignment.

6. Apparatus in accordance with claim 4 and including a supply conduit leading to said oil port, said additional means comprises a pressure sensing means, said pressure sensing means being disposed in said conduit, a source of electrical current normally connected to said coil, said pressure sensing means being effective to automatically interrupt current flow to said coil responsive to the sensing of pressures in said conduit of a predetermined low value.

* * * * *